United States Patent

[11] 3,621,254

| [72] | Inventor | Casimer J. Borkowski<br>Oak Ridge, Tenn. |
|---|---|---|
| [21] | Appl. No. | 30,715 |
| [22] | Filed | Apr. 22, 1970 |
| [45] | Patented | Nov. 16, 1971 |
| [73] | Assignee | The United States of America as represented by the United States Atomic Energy Commission |

[54] DIFFERENTIAL PRESSURE NUCLEAR RADIATION FLUX DETECTOR
7 Claims, 2 Drawing Figs.

[52] U.S. Cl. .................................................... 250/83 R,
                                                        250/83.1
[51] Int. Cl. ...................................................... G01t 1/16
[50] Field of Search .......................................... 250/43.5 R,
                                             83 R, 83.1; 73/23 R

[56] References Cited
UNITED STATES PATENTS

| 2,756,345 | 7/1956 | Replogle, Jr. et al. ........ | 250/83.1 |
| 2,824,971 | 2/1958 | Weeks ........................... | 250/83.1 |
| 3,014,129 | 12/1961 | Martin ........................... | 250/43.5 R |

*Primary Examiner*—James W. Lawrence
*Assistant Examiner*—Davis L. Willis
*Attorney*—Roland A. Anderson

ABSTRACT: A radiation flux detector has been provided which includes a pair of chambers, each filled with a different gas and each sensitive and nonsensitive, respectively, to the flux being measured, located in the flux of interest. The pressure in the chamber filled with the sensitive gas changes at a faster rate than in the other chamber in the presence of the radiation flux and the differential pressure between the chambers is measured by a remote detector communication with the chambers to provide an indication of the flux density.

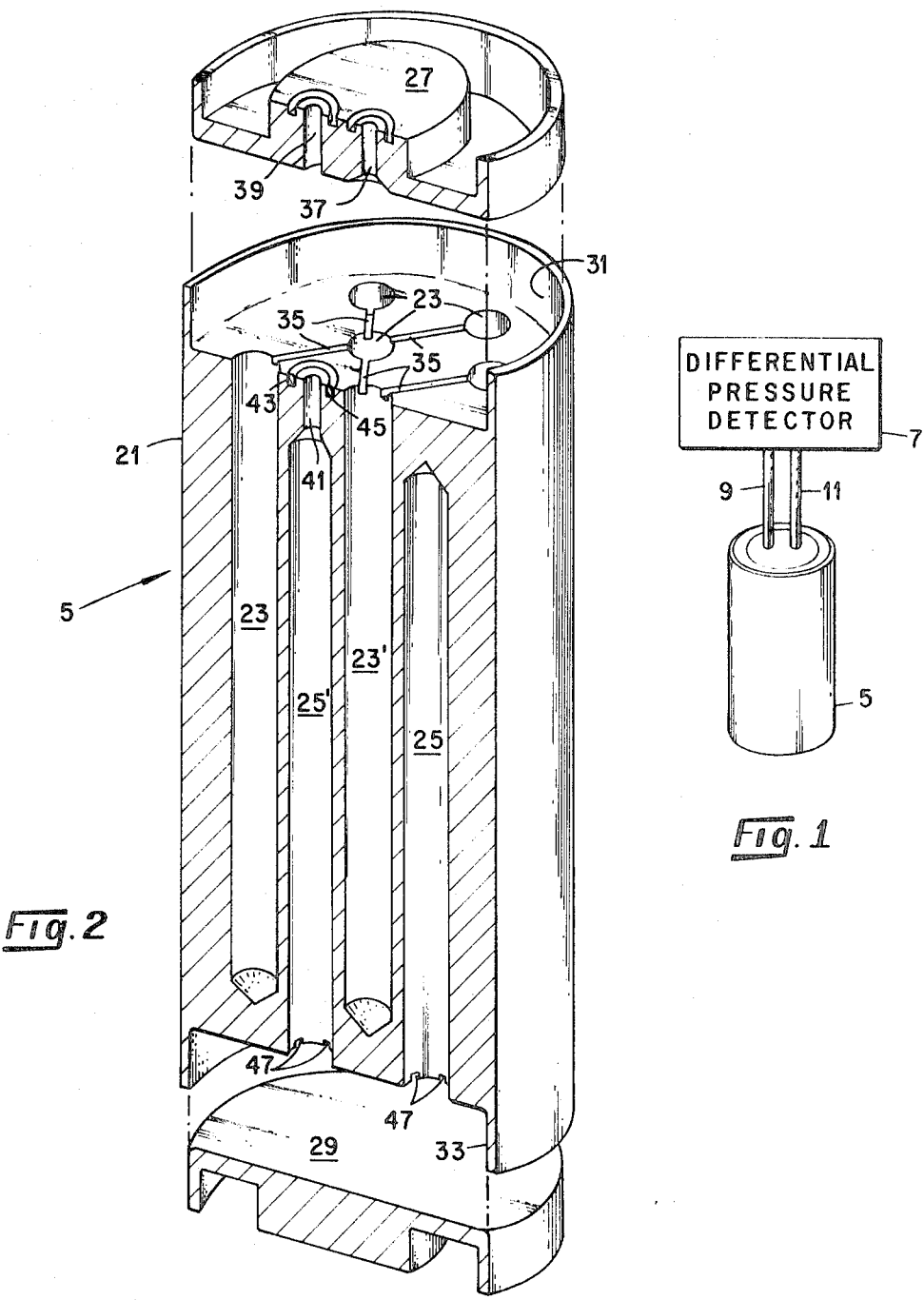

\# DIFFERENTIAL PRESSURE NUCLEAR RADIATION FLUX DETECTOR

BACKGROUND OF THE INVENTION

The present invention relates to a radiation-monitoring device utilizing multiple chambers containing two different gases, one having a high particle capture cross section, the other a lower particle capture cross section. A measurement of the differential pressure between the chambers provides an indication of the flux density of nuclear radiation or nuclear particles, charged or uncharged.

The present invention was made during the course of, or under, a contract with the United States Atomic Energy Commission.

In monitoring nuclear reactors it is desirable that some of the sensors be nonelectrical for backup and safety reasons. The advantage of nonelectrical sensors particularly is that they do not depend on external electrical power and do not have insulated electrical leads that may fail under radiation exposure in the reactor environment. Any nuclear radiation sensor, whether electrical or not, to be useful needs: (a) to have a fast speed-of-response, that is, it should respond very quickly to changes in flux; (b) the materials of construction need to assure a long life for the sensor; and (c) the sensor needs to be serviceable with the reactor at power.

In the prior art the neutron thermocouple, or boron thermopile, is probably the most widely used neutron flux detector (next to ionization chambers and counters) for use in a reactor. This device usually consists of a chromel-alumel thermopile with boron-10 deposits at each hot junction. Because of the boron isotopes' affinity for neutrons, the temperature of the boron alloyed bead varies with the neutron flux. The time constant of the neutron thermocouple is about 150 milliseconds, somewhat slower than desirable.

Certain other device which also require electrical connections to the detector have been provided in the art for neutron detection. Generally, these devices take the form of a chamber containing a gas together with a fissionable material, such as U-235. Upon subjecting the chamber to a neutron flux the fission of U-236 generates a fixed amount of heat according to the flux density which, in turn, heats the gaseous medium. A transducer for measuring the temperature or pressure of the chamber is provided to produce an electrical output signal proportional to the rise in temperature or pressure, respectively, whose value is indicative of the neutron flux density.

Further, it is known in the art to use a pair of chambers each filled with the same gas and one containing a fissionable material as in the above example. A typical example of this type of detector is disclosed in U.S. Pat. No. 2,824,971 to Weeks, issued May 16, 1955, entitled "Neutron Detector" and having a common assignee with the present invention.

As disclosed in the patent to Weeks, the two chambers are interconnected in fluid communication by means of a restrictive orifice. A fissionable material in the form of a wire mesh is disposed in one chamber and the chambers are separated by a flexible diaphragm of electrical conductive material. A pair of electrically conductive plates are mounted one adjacent each side of the diaphragm to form a pair of capacitors. Separate electrical leads connected to the plates and the diaphragm are conveyed through a conduit to an external bridge circuit. A defection of the diaphragm due to a differential pressure between the chambers changes the capacitance and provides an output signal from the bridge circuit proportional to the differential pressure. A neutron shutter is designed to open and close the chamber containing the fissionable mass to the neutron flux by means of a remote controlled, spring biased solenoid while the other gas-filled chamber remains shielded from neutrons. Thus when the shutter is opened and the fissionable mass is subjected to the neutron flux, the gas is heated causing the pressure to rise in that chamber while the other chamber remains unaffected, thereby providing an output signal to the bridge circuit.

The present invention is unique in that completely separate gaseous mediums in sealed equal volume chambers are provided in which one chamber has a high particle capture cross section gas and the other a low particle capture cross section gas for the radiation being detected. Upon exposure of the chambers to the radiation flux a pressure differential is obtained between the chambers which may be measured by means of an external differential pressure detector in fluid communication with each chamber to provide a measurement of the radiation flux density. There are no electrical leads into the detector and there are no moving parts as in the conventional prior art devices which present the possibility of failure, thereby providing a detector which is much more reliable and extremely less expensive to build and operate. The present device has the further distinct advantage of longer use over the prior art device, especially in a reactor environment, in that when the gas is depleted it can be replaced without removing the device from the reactor.

SUMMARY OF THE INVENTION

Briefly, the present invention is a radiation flux density detector having a first enclosed volume containing a gaseous medium of a high particle capture cross section for the radiation being measured, a second enclosed volume containing a different gaseous medium of substantially lower particle capture cross section for the radiation being measured than the first gaseous medium, and means in fluid communication with each of said enclosed volumes for measuring the pressure differential between the first and second volumes, thereby providing an indication of the density of the radiation flux being measured.

Accordingly, it is an object of this invention to provide a radiation detector which does not require any electrical leads exposed to radiation.

A further object of this invention is to provide a radiation detector which is very inexpensive to build and operate.

Still another object of this invention is to provide a detector which does not deteriorate at high temperatures and high flux levels.

Yet another object of this invention is to provide a radiation detector for measuring the intensity of the radiation by a direct measurement of the differential pressure between a pair of sealed chambers each containing a different gas, one gas having a high particle capture cross section and the other a substantially lower particle capture cross section for the radiation being measured.

Other objects and many of the attendant advantages of the present invention will be evident from the following detailed description together with the accompanying drawings.

BRIEF DESCRIPTION OF THE DRAWINGS

FIG. 1 is a pictorial view of a nuclear radiation flux detector according to the present invention; and FIG. 2 is an exploded cross-sectional view of the sensor head of the detector shown in FIG. 1.

DETAILED DESCRIPTION

Referring now to the drawings wherein there is illustrated the preferred embodiment of the present invention for use as a neutron detector in a reactor environment. As shown in FIG. 1, the sealed sensor head 5 containing first and second identical volume sealed chambers, is connected to a conventional differential pressure detector 7 by means of pressure lines 9 and 11 connected in fluid communication with and forming a part of the first and second enclosed chambers, respectively. The differential pressure detector 7 may be a conventional differential-pressure-measuring device or transducer.

As shown in FIG. 2, the sensor head 5 is a cylindrical housing 21 having a plurality of blind chambers 23 and 25. The chambers 23 and 25 are evenly distributed within the housing in an intermingled array so that they will be evenly exposed when the sensor head is placed in a radiation flux.

The housing is preferably made of a structurally sound radiation pervious metal, such as aluminum, and the chambers are formed by drilling the holes into the respective ends of the housing 21 to predetermined depths so as to form blind chambers. The two sets of chambers are drilled so as to form equal volumes within the housing. The chambers 23 and 25 are preferably sealed at each end by means of end caps 27 and 29 which are welded into the housing end recesses 31 and 33, respectively. The chambers 23 are interconnected for fluid communication therebetween by means of channels 35 which become passageways when the end cap 27 is welded in place. As shown, the end cap 27 has two passageways 37, 39 which are adapted to receive lines 9 and 11, respectively (FIG. 1), so as to form an airtight sealed connection to the sensor head. The passageway 37 is aligned with chamber 23' when the end cap 27 is in place for fluid communication between line 9 and the chambers 23. The passageway 39 is likewise aligned with an extending aperture 41 of the chamber 25'. Since the chambers 23 and 25 are to contain separate gases a deformable metal seal ring 43 is placed in a recess 45 so that when the end cap 27 is pressed in place and welded the fluid in chambers 25 does not leak into the end recess 31 and chambers 23. The remaining chambers 25 are interconnected by means of channels 47 similar to channels 35 in the top recess and the lower end cap 29 is sealably welded in the lower housing recess 33 to complete the structure of the sensor head. Thus it will be seen that when the sensor head is sealed, two equal volumes are enclosed which communicate with the pneumatic lines 9 and 11.

In operation as a neutron detector, for example, one closed volume is filled by means of conventional vacuum filling procedures with a high neutron capture cross section gas such as $^3$He and the other is filled in the same manner with a low neutron capture cross section gas, such as $^4$He. Once the chambers are filled to a pressure typically in the range of from 1 to 100 atmospheres, the lines 9 and 11 are connected to the differential pressure detector 7 and the sensor head 5 is placed in a neutron flux to be measured. Since the sets of chambers 23 and 25 are intermingled, the separate volumes are evenly exposed to the flux density and a direct measurement of the pressure differential between the two volumes is indicative of the neutron flux density and the pressure detector can be calibrated to read the flux density directly. The connecting lines 9 and 11 are preferably very small diameter tubing so that their volume is small compared to the chamber volumes.

To test the operation of the $^3$He-$^4$neutron detector, the sensor head was placed in a nuclear reactor. When the reactor was started, the differential pressure rose and leveled off with the attainment of a constant neutron flux. The differential pressure indication remained constant until the reactor was scrammed and then it dropped to substantially zero. The response time of the detector was 250 msec., limited by the drop time of the safety rods. The neutron flux in this case was $10^{12}$ n./cm.$^2$-sec. and a differential pressure of 0.48 mm. resulted—corresponding to a 0.2° C. temperature differential in the two volumes.

One particular advantage of the $^3$He-$^4$He combination is the very good gamma discrimination and temperature insensitivity provided thereby. The sensor was tested in a gamma field of $10^6$ R./hr. and a differential temperature of only 0.001° C. between the two volumes resulted, and a pressure signal of just 0.0024 mm. was recorded. A temperature differential of 0.001° C. was noted when the sensor head temperature was changed from a boiling water bath to an ice water bath.

As presently developed, differential pressures in the range of $10^{-4}$ or $10^{-3}$ to 10 mm. Hg. have been used. Detectors with a dynamic pressure range of 1,000 have been constructed. A typical $^3$He or $^4$He volume is 50 ml. The lifetime of the sensor would be of the same order of magnitude as a conventional ion chamber placed in the same neutron flux. A lifetime of 2 to 3 years in a $10^{10}$ neutron flux is expected. In higher fluxes, the gas would be depleted much faster. However, the advantage of the present gas-filled detector is that when depleted, the gases can be replaced without removing the device from the reactor. Additionally, an advantage of helium gas is that the helium is already present for leak checking the assembled sensor before installation.

It is conceivable that the sensor gas pressure could be raised to 3-10 atmospheres pressure instead of the 1 atmosphere presently used. A substantial improvement in sensitivity would be expected. The utilization of higher pressures or larger chambers would increase the sensitivity of the detector.

Neutron flux sensors of the subject type may be constructed using substances other than $^3$He-$^4$He. For example, the high neutron capture cross section gas may be $^{10}$RF$_3$ and the low neutron capture cross section gas may be $^{11}$BF$_3$.

Accordingly, the device can be made to be sensitive to other radiation such as gamma and electron by using high and low mass gases in the chambers 23 and 25, respectively. The gases would be, for example, Xenon-54 ($^{54}$Xe) and helium-4 ($^4$He). These gases would be insensitive to environmental temperature changes just like the $^3$He and $^4$He combination, that is, at equal temperatures they would produce equal pressures since the pressure developed in heated gases does not depend on the masses. The "stopping power" of $^{54}$Xe for electrons and gamma rays is 50-100 times that of helium, so that a gamma or electron flux can be measured using these two different gases.

Thus it will be seen that a very versatile radiation flux density detector has been provided which requires that no electrical connections are exposed to the radiation. The sensor operates by a means of pneumatic signals and has a speed-of-response of less than 10 milliseconds. It allows for the replacement of the sensing gas in the detector with the reactor at power. It is simple in structure and may be constructed from many reactor compatible materials for reactor environment use. Although a specific configuration has been described, it will be obvious to those skilled in the art that many configurations are possible, depending on the radiation to be sensed, and the size, sensitivity, and range desired for the detector.

Accordingly, the invention should be considered limited only by the following claims forming a part of this specification.

What is claimed is:

1. A nuclear radiation flux detector comprising:
   a first sealed chamber for exposure to the radiation being measured;
   a second sealed chamber for exposure to said radiation being measured, said second chamber having a volume substantially equal to that of said first chamber;
   a gas of a high particle capture cross section in said first chamber;
   a gas of a substantially lower particle capture cross section in said second chamber; and
   means connected in fluid communication with each of said chambers for measuring the pressure differential between said chambers.

2. A detector as set forth in claim 1 wherein said means for measuring the pressure differential between said first and second chambers includes a pneumatic differential pressure detector and a pair of pneumatic lines connected between said pressure detector and said first and second sealed chambers, respectively, said pneumatic lines forming a part of the sealed equal volumes of said chambers.

3. A detector as set forth in claim 2 wherein said first and second chambers are disposed so as to be subject to substantially the same ambient temperature.

4. A detector as set forth in claim 3 wherein said first and second chambers are formed within a sensor head composed of a radiation pervious material including:
   a first plurality of blind chambers interconnected in fluid communication forming said first sealed chamber;
   a second plurality of blind chambers interconnected in fluid communication forming said second sealed chamber, said first and second chambers being formed within said housing in an intermingled array so as to be evenly exposed to the incident radiation flux.

5. A detector as set forth in claim 4 wherein said first gas is $^3$He and said second gas is $^4$He.

6. A detector as set forth in claim 5 wherein said chambers are filled with gas to a pressure in the range of between 1 and 100 atmospheres.

7. A detector as set forth in claim 4 wherein said first gas is $^{54}$Xe and said second gas in $^4$He.

* * * * *